US007051114B1

(12) United States Patent
Ravishankar et al.

(10) Patent No.: US 7,051,114 B1
(45) Date of Patent: May 23, 2006

(54) SYSTEM AND METHOD FOR INTEGRATING DIRECTORY SERVERS

(75) Inventors: Geetha Ravishankar, Glen Ellen, VA (US); Satish Joshi, Glen Ellen, VA (US); Zhiwei Zhang, Richmond, WA (US)

(73) Assignee: Cisco Technology, Inc., San Jose, CA (US)

( * ) Notice: Subject to any disclaimer, the term of this patent is extended or adjusted under 35 U.S.C. 154(b) by 876 days.

(21) Appl. No.: 09/705,148

(22) Filed: Nov. 1, 2000

(51) Int. Cl.
*G06F 15/16* (2006.01)
(52) U.S. Cl. ......................... 709/245; 709/223; 707/10; 379/88.22
(58) Field of Classification Search ............... 707/9, 707/10, 103 R; 709/227, 229, 245, 223; 379/88.22
See application file for complete search history.

(56) References Cited

U.S. PATENT DOCUMENTS

| | | | |
|---|---|---|---|
| 6,154,743 A * | 11/2000 | Leung et al. ................. 707/10 |
| 6,360,230 B1 * | 3/2002 | Chan et al. ............. 707/103 R |
| 6,484,177 B1 * | 11/2002 | Van Huben et al. .......... 707/10 |
| 6,708,170 B1 * | 3/2004 | Byrne et al. ................... 707/9 |
| 6,714,930 B1 * | 3/2004 | Garrison et al. ............... 707/9 |
| 2002/0010781 A1 * | 1/2002 | Tuatini ....................... 709/227 |
| 2002/0046286 A1 * | 4/2002 | Caldwell et al. ............ 709/229 |

OTHER PUBLICATIONS

Ralph E. Droms, "Access to Heterogenous Directory Services", IEEE, Jun. 1990, pp. 1054-1061.*
RFC 1777 (LDAP) "Lightweight Directory Access Protocol" ISODE Consortioum, Mar. 1995.
RFC 2252 "Lightweight Directory Access Protocol (v3): Attribute Syntax Definitions" ISODE Limited, Dec. 1997.

* cited by examiner

*Primary Examiner*—Jungwon Chang
(74) *Attorney, Agent, or Firm*—Cindy Kaplan (57) ABSTRACT

A method for integrating a network application with different directory servers, each server having a different schema. The method includes providing meta-data specifying directory servers available to the application and a table mapping attributes utilized by the network application with attribute names used by the directory servers available to the application. The method further includes identifying in the table the directory server attribute name corresponding to an attribute requested by the application when the application runs. A request containing the identified directory server attribute name is sent to the corresponding directory server and information is received in response to the request.

22 Claims, 5 Drawing Sheets

SYSTEM AND METHOD FOR INTEGRATING DIRECTORY SERVERS

BACKGROUND OF THE INVENTION

The present invention relates generally to directory services, and more particularly, to a system and method that allows an application to utilize different implementations of directory services.

Directory services play an important role in helping users locate resources on a network. The need for this function has grown along with the growth in the size of networks. Lightweight Directory Access Protocol (LDAP) is an Internet Engineering Task Force (IETF) open standard that provides directory services to applications ranging from e-mails systems to distributed system management tools. LDAP is a protocol that is based on a client-server model in which a client makes a TCP/IP connection to an LDAP server, sends requests, and receives responses. LDAP allows applications and users to access information from many diverse directories. For example, Web servers need to look up a user's access control rights before serving that user a Web page. Messaging servers need to know where a user's mailbox is located so that they can route e-mail correctly. Web proxies and firewalls need to authenticate users before allowing them onto the public Internet. LDAP defines operations for interrogating and updating the directory. Operations are provided for adding and deleting an entry from the directory, changing an existing entry, and changing the name of an entry. An LDAP query request permits a portion of the directory to be searched for entries that match certain criteria specified by a search filter. Information can be requested from each entry that matches the criteria.

The LDAP information model is based on an entry which contains information about an object. An entry is a collection of attributes that has a name, called a distinguished name (DN), which is a unique reference for that entry. In LDAP, directory entries are arranged in a hierarchical tree-like structure. A set of object definitions and their associated attributes is known as a schema. Currently there is no standardization of attributes of schema, thus each directory server vendor has been left to develop its own schema. Therefore, an application schema used for one directory server often has to be modified to work with a different directory server. Furthermore, in order to replicate or synchronize LDAP data on one server to another server of a different vendor, the schema often has to be modified. In order to use an application with different directory servers, the application code typically has to be modified. Thus, every time an application has to operate with a new directory server, the code has to be modified.

There is, therefore, a need for a system and method that allows an application to obtain data from different directory servers without having to modify application code.

SUMMARY OF THE INVENTION

A method and system for integrating an application with different types of directory servers are disclosed.

A method for integrating a network application with different directory servers each server having a different schema, generally comprises providing meta-data specifying directory servers available to the application and a table mapping attributes utilized by the network application with attribute names used by the directory servers available to the application. The method further includes running the network application and identifying in the table the directory server attribute name corresponding to an attribute requested by the application. A request containing the identified directory server attribute name is sent to the corresponding directory server and information is received in response to the request.

In another aspect of the invention, a computer program product for integrating a network application with different directory servers generally comprises code that provides a table mapping attributes utilized by the network application with attribute names used by the directory servers available to the application and code that runs the network application. The product further includes code that identifies in the table the directory server attribute name corresponding to an attribute requested by the application, code that sends a request containing the identified directory server attribute name to the corresponding directory server, and code that receives information in response to the request. A computer readable medium is provided to store the computer codes.

In yet another aspect of the invention, a system for integrating a network application with different directory servers generally comprises a table mapping attributes utilized by the network application with attribute names used by the directory servers and memory that at least temporarily stores the table. The system further includes a processor that identifies in the table the directory server attribute name corresponding to an attribute requested by the application and sends a request containing the identified directory server attribute name to the corresponding directory server.

In another aspect of the invention, a system for integrating a network application with different directory servers generally comprises a table mapping attributes utilized by the network application with attribute names used by directory servers available to the application. The system further comprises means for identifying in the table the directory server attribute name corresponding to an attribute requested by the application and means for searching the directory server for the requested attribute with the identified directory server attribute name.

The above is a brief description of some deficiencies in the prior art and advantages of the present invention. Other features, advantages, and embodiments of the invention will be apparent to those skilled in the art from the following description, drawings, and claims.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention is for use with a directory server and may be used in the context of a network system having one or more directory servers. The system and method of the present invention integrate different implementations of directory services so that a single application may use different directory servers without requiring modification to code of the application. As further described below, the invention utilizes a memory based attribute mapping table to integrate network applications with different directory servers. The present invention may be used, for example, with LDAP (Lightweight Directory Access Protocol) servers. As previously described, different LDAP vendors (e.g., Netscape, Microsoft Active Directory, DCL) utilize different rules for constructing a schema. In conventional systems, the application code would have to be modified to work with different LDAP vendors. The present invention allows applications to work with the different LDAP implementations without modification to the code. The application incorporates run time changes to communicate with different LDAP vendors instead of requiring the code of the application to be modified and recompiled every time the application needs to access a different directory server.

Figure 1:
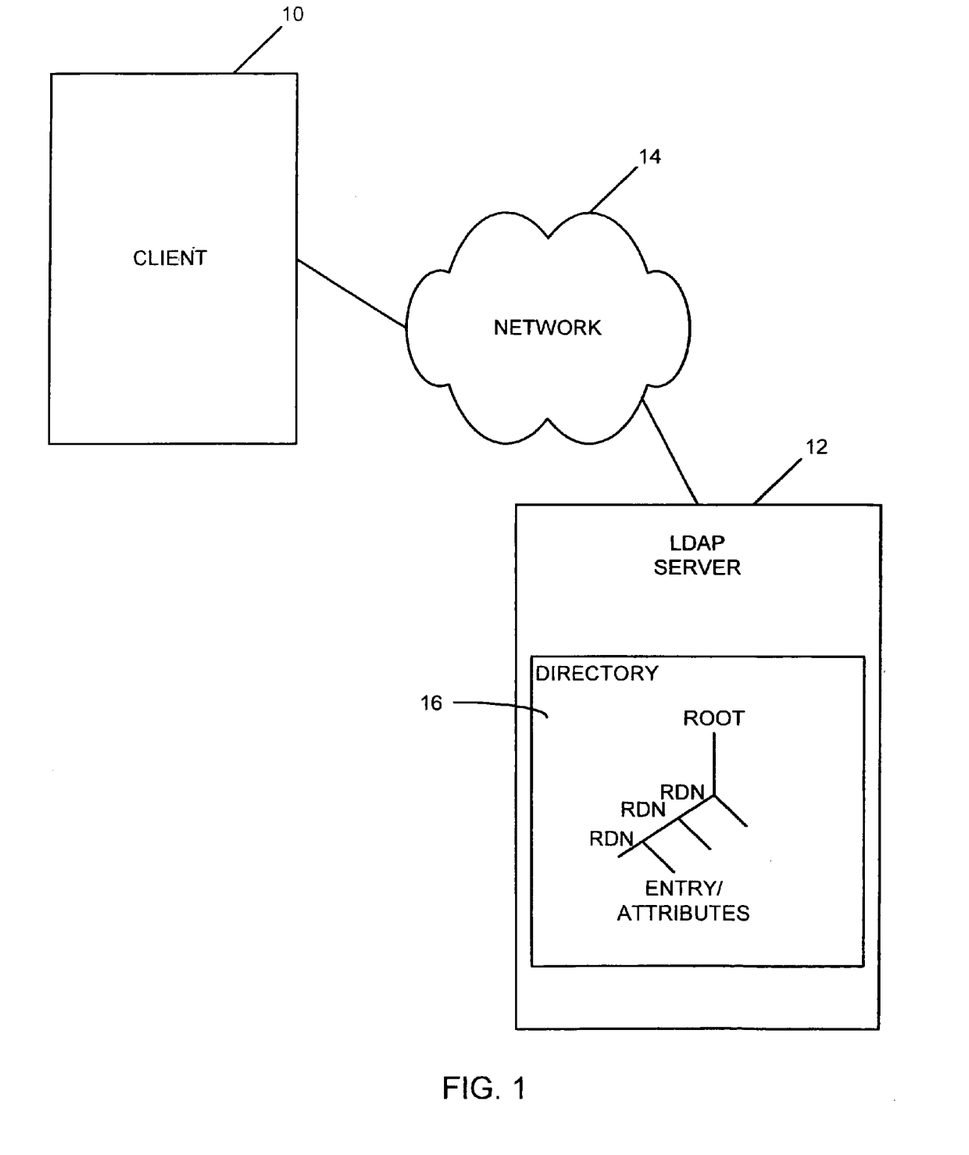
FIG. 1 is a schematic illustrating an exemplary LDAP implementation and directory.

Referring now to the drawings, and first to FIG. 1, an exemplary LDAP directory server in which the present invention may be implemented is shown. A client machine 10 makes a TCP/IP connection to an LDAP server 12 through network 14, and sends requests and receives responses through the network. LDAP server 12 supports a directory 16 which includes various entries, each containing information about an object. Entries are composed of attributes, which have a type and one or more associated values. Each attribute has a particular syntax that determines what kinds of values are allowed in the attribute and how these values are constrained during a particular directory operation. The directory tree is organized in a predetermined manner with each entry uniquely named by a relative distinguished name (RDN). The RDN includes at least one distinguished attribute value from the entry and one value from each attribute is used in the RDN. A globally unique name for an entry, referred to as a distinguished name (DN), comprises a concatenation of the RDN sequence from a given entry to the tree root. An attribute type is identified by a short descriptive name and an OID (object identifier). An example of an attribute is "mail". There may be one or more values of this attribute. Schema is the collection of attribute type definitions, object class definitions and other information which a server uses to determine how to match a filter or attribute value against the attributes of an entry, and whether to permit add or modify operations.

The directory service allows for information about an enterprise or subscribers to be sorted and easily retrieved by directly searching for that information or by searching for related but more easily remembered information, such as a name. LDAP defines operations for interrogating and updating the directory. Operations are provided for adding and deleting an entry from the directory, changing an existing entry, and changing the name of an entry. A LDAP query request permits a portion of the directory to be searched for entries that match certain criteria specified by a search filter. LDAP is described in further detail in Network Working Group RFCs (Request For Comments) 1777 (Lightweight Directory Access Protocol, W. Yeong et al., dated March 1995) and 2252 (Lightweight Directory Access Protocol Attribute Syntax Definitions, M. Wahl et al. dated December 1997), which are incorporated herein by reference.

Figure 2:
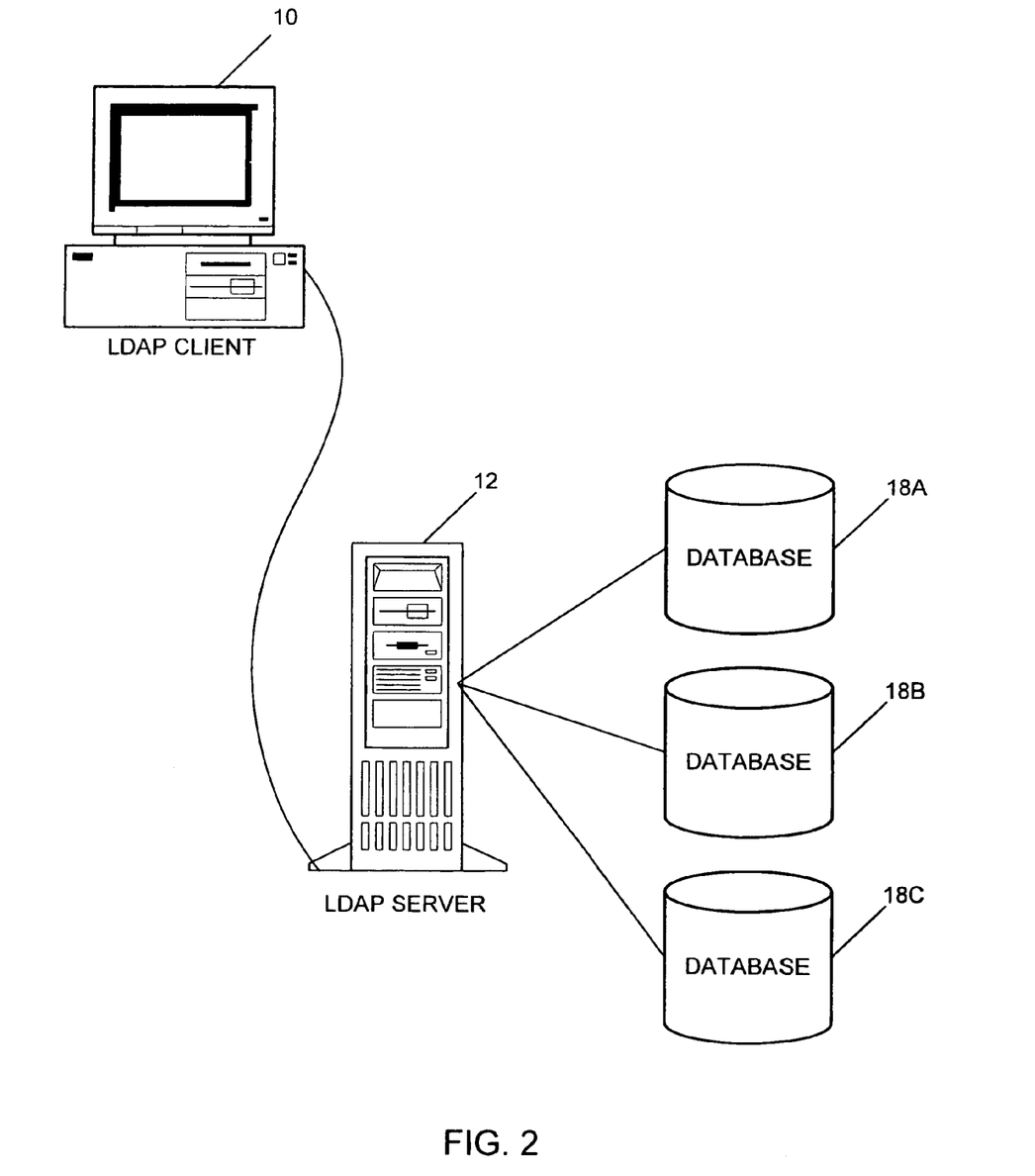
FIG. 2 is a schematic illustrating an LDAP client, server, and databases.

The LDAP client 10 can connect to a number of networked databases 18a, 18b, 18c through the LDAP server 12, as illustrated in FIG. 2. The databases 18a, 18b, 18c contain directory information and the LDAP server 12 is able to retrieve information from multiple database servers. It is to be understood that the client/server arrangement may be different than shown herein and that directory protocols other than LDAP may be used without departing from the scope of the invention.

Figure 3:
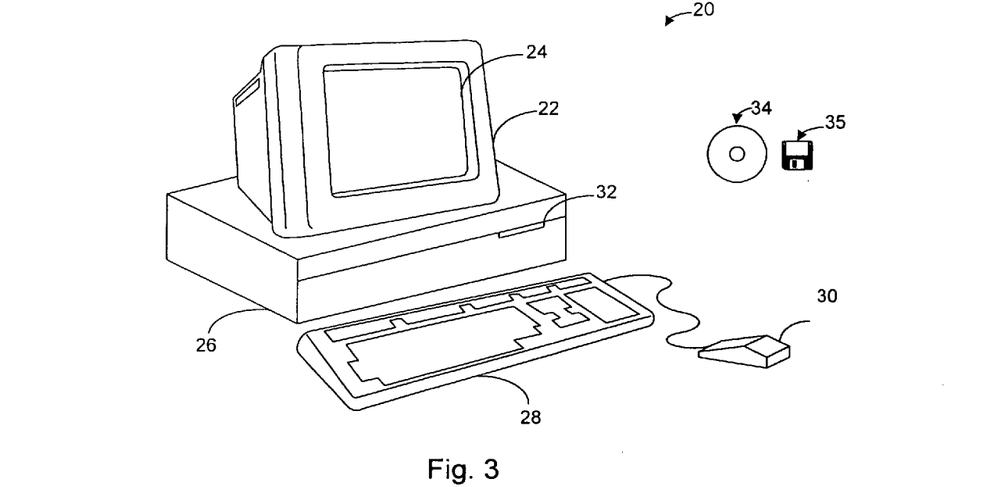
FIG. 3 is a schematic illustrating an example of a computer system that can be utilized to execute software of an embodiment of the present invention.

As discussed above, the present invention operates in the context of a data communication network including multiple nodes. Nodes of a network may be user workstations, servers, or routers, for example. FIG. 3 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 4) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive may be utilized. Additionally, a data signal embodied in a carrier wave (e.g., in a network including the Internet) may be the computer readable storage medium.

Figure 4:
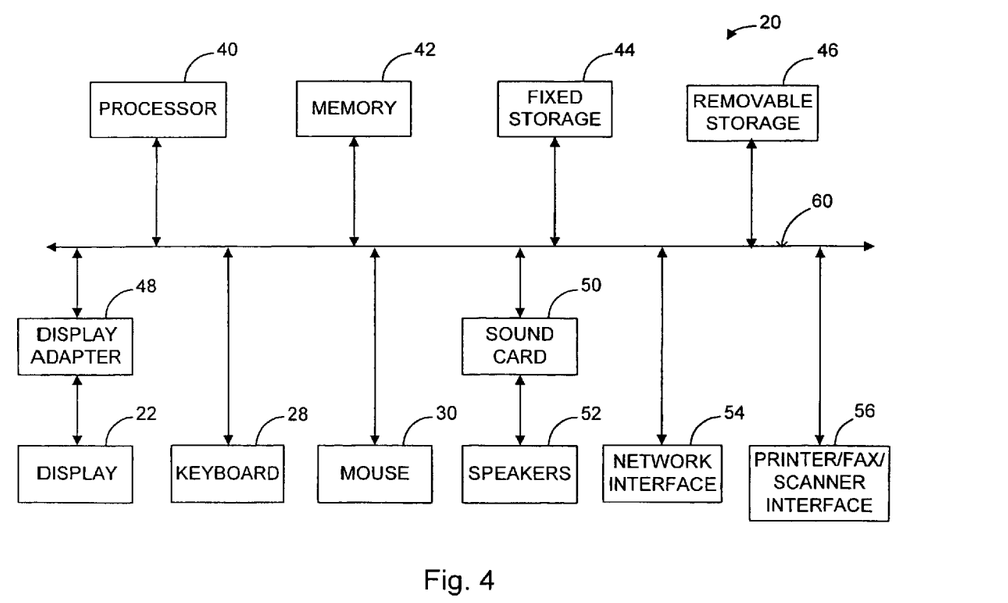
FIG. 4 is a system block diagram of the computer system of FIG. 3.

FIG. 4 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 4. However, these arrows are only illustrative of one possible interconnection scheme serving to link the subsystems. For example, a local bus may be utilized to connect the central processor 40 to the system memory 42 and display adapter 48. Computer system 20 shown in FIGS. 3 and 4 is only one example of a computer system suitable for use with the invention. Other computer architectures having different configurations of subsystems may also be utilized.

The system of the present invention utilizes a meta-data table and an attribute mapping table (e.g., LDAP_attribute list table described below) to integrate an application with different directory servers, without modifying application code. The meta-data is used to tie together products that provide proprietary directory services. The following is an example of a meta-data table:

Menus_define.tab
Menus_AcceptNHotKeys_Tab|5|MenuName|32|Accept-
   KeysList|75|HotKeysList|50|MinLen|2|MaxLen|2|
Menus_Help_Phrase_List_Tab|3|MenuName|32|Help-
   PhraseList|659|Prompt2PhraseList|659|
Menus_Prompt_Phrase_List_Tab|2|MenuName|32|Prompt-
   PhraseList|659|
LDAP_Attribute_List_Tab|3|CiscoAttr|32|Netscape-
   |32|DCL|32|
TieLineTelList_Tab|2|ExtraDigit|32|TieLineExtension|32|
Email_Attachment_Type_Tab|3|ContentType|15|Content-
   SubType|200|ContentDesc|200|
AA_Type_Table|3|PhoneNumber|11|Mode|14|Operator|11|
Languages_Tab|2|ISO|3|Common|10|

This file contains the meta-data for the LDAP_attribute list table shown below. Line 5 of the table contains the number of columns and the column names in the LDAP_attribute list table. For example, the meta-data table shown above is used to integrate a Netscape LDAP server and DCL LDAP server with an application using attributes defined in CiscoAttr.

The following lists a portion of an exemplary attribute mapping table:
   LDAP_Attribute_Lists.tab
   Cisco_attr|Netscape_Attr|DCL_attr|
   ActiveGreetings|ActiveGreetingID|ActiveGreetingID|
   AutoPlayOfMessages|AutoPlayOfMessages|AutoPlay-
      OfMessages|
   BadLoginCount|BadLoginCount|BadLoginCount|
   GreetingSecMax|GreetingSecMax|GreetingSecMax|
   InHoursEnd|InHoursEnd|InHoursEnd|
   LoginRetriesMax|LoginRetriesMax|LoginRetriesMax|
   MaxLoginLockout|MaxLoginLockout|MaxLoginLockout|
   MessageInventory|MessageInventory|MessageInventory|
   MsgLenMaxVoice|MsgLenMaxVoice|MsgLenMaxVoice|
   NoForLastName|NoForLastName|NoForLastName|
   NumberRingsOut|NumberRingsOut|NumberRingsOut|
   PagerNumber|PagerNumber|PagerNumber|
   PagerPassword|PagerPIN|PagerPIN|
   notifyvoicenormal|notifyvoicenormal|notifyvoicenormal|
   notifyvoiceurgent|notifyvoiceurgent|notifyvoiceurgent|
   objectclass|objectclass|objectclass|
   pagerenabled|pagerenabled|pagerenabled|
   passwdlenmax|passwdlenmax|passwdlenmax|
   passwdlenmin|passwdlenmin|passwdlenmin|
   password|password|emailpassword|
   postofficeid|mailhost|mailhost|
   distlist|cn|cn|
   definition|mgrprfc822mailmember|mgrprfc822mail-
      member|

The first column (Cisco_Attr) contains the LDAP attributes as referred to within the application source code. The subsequent columns contain the attribute name mapping for the different LDAP server types (Netscape, DCL). The first column is used to get to the appropriate directory related data for a specific server. The table thus includes the LDAP attribute name alias used by the application and the actual attribute names (i.e., names defined in schema) used by different directory servers. It is to be understood that the table may include attributes for directory servers other than Netscape or DCL and may include attributes for more than two different types of directory servers.

Figure 5:
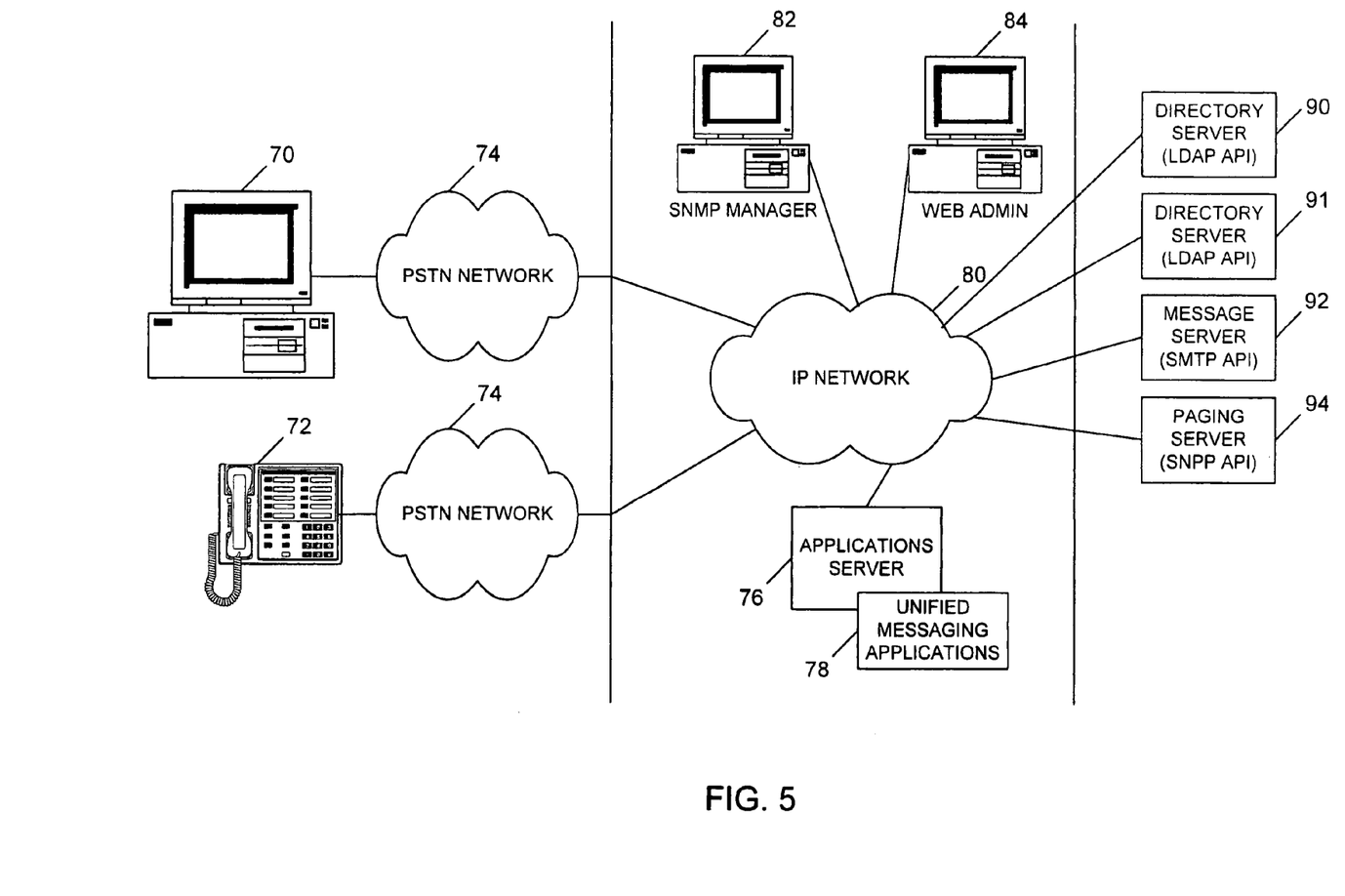
FIG. 5 is a schematic illustrating implementation of the present invention in a unified communications application.

The present invention may be used, for example in a voice and unified messaging application such as Cisco Unified Open Network Exchange (Cisco uOne). FIG. 5 illustrates a three-tier model used to implement uOne. The system includes access services, application services, and backend services. The access services include, for example, a computer 70 and telephone 72 connected to the application services through PSTNs (Public Switched Telephone Networks) 74. The application services include applications server 76 and unified messaging application 78 which are accessed over an IP network 80. The application server 76 may be configured to support incoming e-mail from clients in SMTP (Simple Mail Transfer Protocol), provide client/user directory services using LDAP, issue outgoing mail to clients in IMAP (Internet Mail Access Protocol) and communicate with external servers using SMTP. Directory services are used to authenticate and store and retrieve subscriber profile information. Directory services are also used to keep subscriber mailbox and login information so that the messaging application 78 can retrieve subscriber messages from the mailboxes. Login information is retrieved from the directory service so that the messaging server 92 can be logged into and the messages retrieved. An SNMP (Simple Network Management Protocol) manager 82 and web administrator 84 are also in communication with the IP network 80. The backend services include one or more directory servers 90, 91 (LDAP API), messaging server 92 (SMTP API) and a paging server 94 (SNPP (Simple Network Paging Protocol) API). The unified messaging applications 78 may reside on a gateserver that interfaces with the circuit network through a gateway to any telephone, cellular phone, or fax machine. The messaging applications 78 use the directory servers 90, 91 primarily to store and retrieve user profile information. The present invention allows the messaging applications 78 to support multiple LDAP services. LDAP is used, for example, to retrieve a subscriber's profile from the directory server to determine the type of notification for the subscriber. Once subscriber information is retrieved from the LDAP server 90 it is used to log in to the subscriber's mailbox to retrieve fax or e-mail messages from the messaging server 92 using IMAP. IMAP is used for storage and retrieval of messages from the messaging service.

It is to be understood that the unified messaging application described above is only one example of an application that may be used with the present invention. Any kind of application that interacts with a directory server or obtains data from a directory server may use the attribute mapping table of the present invention so that the application code does not need to be modified to work with different types of directory servers.

Figure 6:
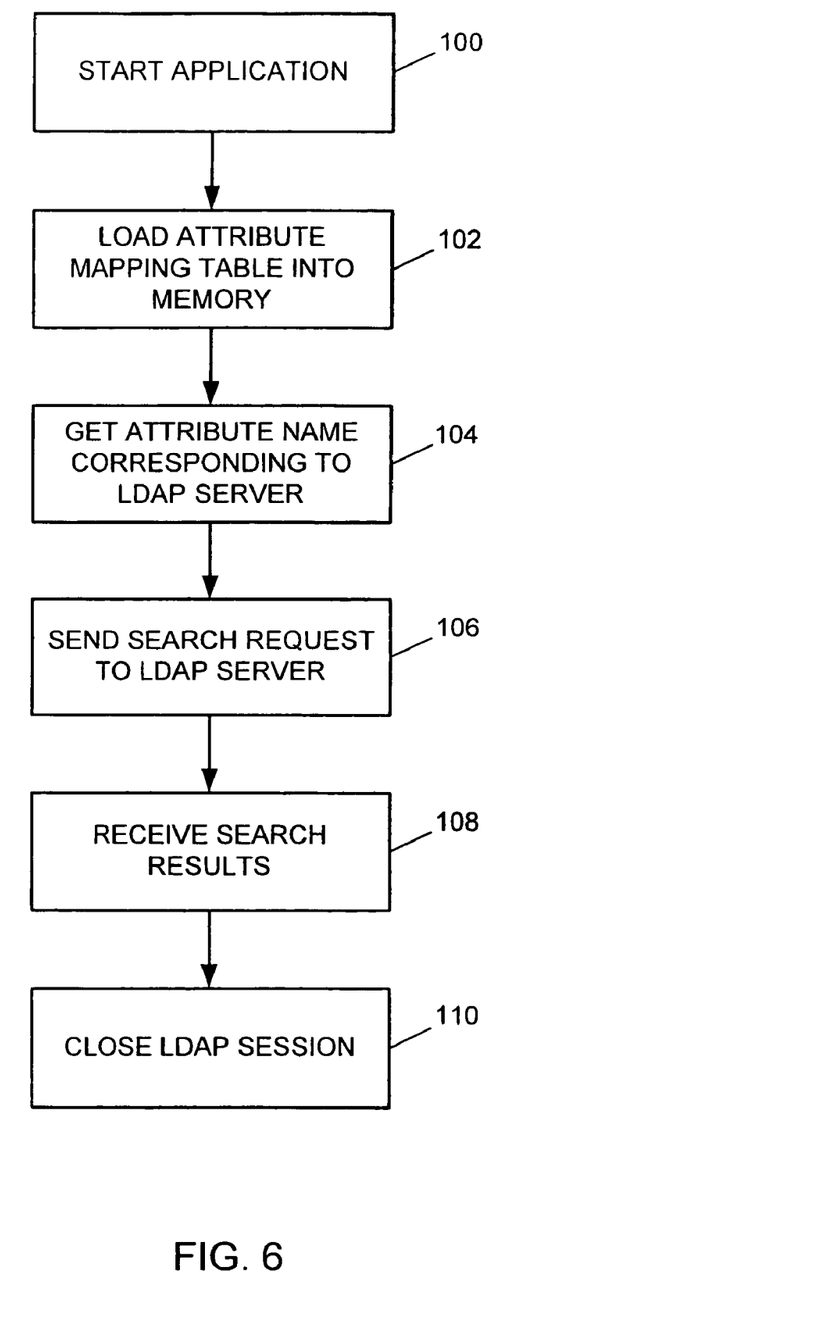
FIG. 6 is a flowchart illustrating a process of the present invention for integrating different directory servers.

FIG. 6 is a flowchart illustrating a process for running an application configured to access different types of directory servers. The client machine 70 may be using LDAP to effect a directory service session with one of the directory servers 90, 91 (FIG. 5). When the application first runs (step 100), it loads the attribute mapping table into memory (step 102) (FIG. 6). The application first uses an alias to obtain the actual LDAP attribute name corresponding to the LDAP server type specified in the application configuration file and then uses the obtained attribute name to perform LDAP operations (step 104). The LDAP API function may then be used to perform a directory search. A search request is sent to the server and the server returns the results (step 106 and 108). The LDAP session is then closed (step 110).

As can be observed from the foregoing, the system and method of the present invention have numerous advantages. The memory based attribute mapping table allows applications to be integrated with various directory services implementations without modifying application code. This reduces the need for customer support and for maintaining different directory server specific versions of application code.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for integrating a voice and unified messaging application at a network device with different directory servers, the network device configured to perform directory services with the directory servers, the method comprising:

storing in memory of the network device an attribute mapping table, the table mapping attribute names utilized by the voice and unified messaging application with corresponding attribute names used by the directory servers available to the voice and unified messaging application, wherein at least two of the directory servers have different schema and wherein at least one of the attribute names used by the directory servers is different from the corresponding attribute name used by the voice and unified messaging application;

searching the attribute mapping table to identify the attribute name used by one of the directory servers corresponding to one of the attribute names utilized by the voice and unified messaging application;

sending from the network device, a request containing the identified directory server attribute name to the corresponding directory server; and receiving information in response to the request, wherein integrating the voice and unified messaging application at the network device with different directory servers comprises integrating without modifying application code at the network device.

2. The method of claim 1 wherein the directory servers are configured for LDAP.

3. The method of claim 1 wherein the number of different directory servers is greater than two.

4. The method of claim 1 further comprising running an IP based software.

5. The method of claim 1 wherein sending a request comprises sending a search request.

6. The method of claim 1 wherein sending a request comprises sending a messaging request.

7. The method of claim 1 further comprising loading the table into memory when the application is run.

8. The method of claim 1 further comprising providing meta-data specifying the directory servers available to the application.

9. The method of claim 1 wherein the attribute name used by the network application is an LDAP attribute name alias used by the application and the attribute name used by the directory server is the attribute name defined in the schema of the directory server.

10. The method of claim 9 wherein at least one of the directory servers is a Netscape directory server and at least one of the directory servers is a DCL directory server.

11. The method of claim 1 wherein sending a request comprises sending a request for a subscriber profile.

12. A computer program product for integrating a voice and unified messaging application at a network device with different directory servers, the network device configured to perform directory services with the directory servers, the computer program product comprising:

code that stores in memory of the network device an attribute mapping table, the table mapping attribute names utilized by the voice and unified messaging application with corresponding attribute names used by the directory servers available to the voice and unified messaging application, wherein at least two of the directory servers have different schema and wherein at least one of the attributes names used by the directory servers is different from the corresponding attribute name used by the voice and unified messaging application;

code that searches the attribute mapping table to identify the attribute name used by one of the directory servers corresponding to one of the attribute names utilized by the voice and unified messaging application;

code that sends from the network device, a request containing the identified directory server attribute name to the corresponding directory server;

code that receives information in response to the request; and a computer readable medium that stores said computer codes, wherein integrating the voice and unified messaging application at the network device with different directory servers comprises integrating without modifying application code at the network device.

13. The computer program product of claim 12 further comprising code that accesses meta-data specifying directory servers available to the application.

14. The computer program product of claim 12 further comprising code that loads the table at least temporarily into memory when the application runs.

15. The computer program product of claim 12 wherein the computer readable medium is selected from the group consisting of CD-ROM, floppy disk, tape, flash memory, system memory, and hard drive.

16. A system for integrating a voice and unified messaging application at a network device with different directory servers, the network device configured to perform directory services with the directory servers, the system comprising:

a table mapping names utilized by the voice and unified messaging application with corresponding attribute names used by the directory servers, wherein at least two of the directory servers have different schema and wherein at least one of the attribute names used by the directory servers is different from the corresponding attribute name used by the voice and unified messaging application;

memory that at least temporarily stores the table; and a processor that identifies in the table the attribute name used by one of the directory servers corresponding to one of the attribute names utilized by the voice and unified messaging application and sends a request containing the identified directory server attribute name to the corresponding directory server, wherein integrating the voice and unified messaging application at the network device with different directory servers comprises integrating without modifying application code at the network device.

17. The system of claim 16 wherein the processor is configured to send the request to an LDAP server.

18. The system of claim 16 wherein the application is configured to communicate with a messaging server.

19. The system of claim 16 wherein the application is configured for communicating with a SNPP API.

20. A system for integrating a voice and unified messaging application with different directory servers, the network device configured to perform directory services with the directory servers, the system comprising:

a table mapping attribute names utilized by the voice and unified messaging application with corresponding attribute names used by directory servers available to the voice and unified messaging application, wherein at least two of the directory servers have different schema and wherein at least one of the attribute names used by the directory servers is different from the corresponding attribute name used by the voice and unified messaging application;

means for identifying in the table the attribute name used by one of the directory servers corresponding to one of the attribute names utilized by the voice and unified messaging application; and means for sending from the network device, a request containing the identified directory server attribute name to the corresponding directory server, wherein integrating the voice and unified messaging application at the network device with different directory servers comprises integrating without modifying application code at the network device.

21. The system of claim 20 wherein means for searching the directory server comprises:

sending a request with the attribute name corresponding to schema for one of the directory servers to the corresponding directory server and receiving information in response to the request.

22. The system of claim 20 wherein means for searching the directory server includes using LDAP.

* * * * *